March 4, 1930. R. B. BURTON 1,749,066
SAFETY STOP FOR VEHICLES
Filed Jan. 5, 1928

Inventor
RALPH B. BURTON,
By
Attorney

Patented Mar. 4, 1930

1,749,066

UNITED STATES PATENT OFFICE

RALPH B. BURTON, OF INDIANAPOLIS, INDIANA, ASSIGNOR OF ONE-HALF TO L. G. S. DEVICES CORPORATION, OF INDIANAPOLIS, INDIANA, A CORPORATION OF INDIANA

SAFETY STOP FOR VEHICLES

Application filed January 5, 1928. Serial No. 244,580.

In the operation of automobiles, accidents have frequently occurred as a result of the tendency of the automobile to run backward down a hill when the power and brakes are released. Thus, in ascending hills, the inexperienced operator frequently finds difficulty in shifting gears, and the automobile loses its forward momentum and begins to coast backward down the hill before the change of gears is effected.

It is the object of my invention to produce a device which may be used in conjunction with an automotive vehicle to prevent any rearward movement thereof unless such rearward movement is actually desired by the operator. More specifically, it is my object to produce such a device which will be positive in operation, economical to manufacture, and which will not interfere with the normal operation of the vehicle. Broadly considered, my invention is not limited in its application to automotive vehicles, but it may be used in connection with any vehicle or object adapted to be moved by driving means in one direction against an opposing force of sufficient magnitude to cause movement in the opposite direction upon release of the driving means.

I accomplish the above objects by providing a helical coil spring which is preferably rotatable when the vehicle with which it is associated is moved; and in connection with such spring, I provide a stationary member having a cylindrical surface against which the spring may bear in such a manner that it will change diameter and move into firm frictional engagement with such surface to prevent rotation of the spring in one direction. To permit intentional movement of the vehicle which would normally cause the spring to clutch the cylindrical surface, I provide spring-releasing mechanism which may be operated whenever the operator desires to produce such movement of the vehicle.

Figure 1:
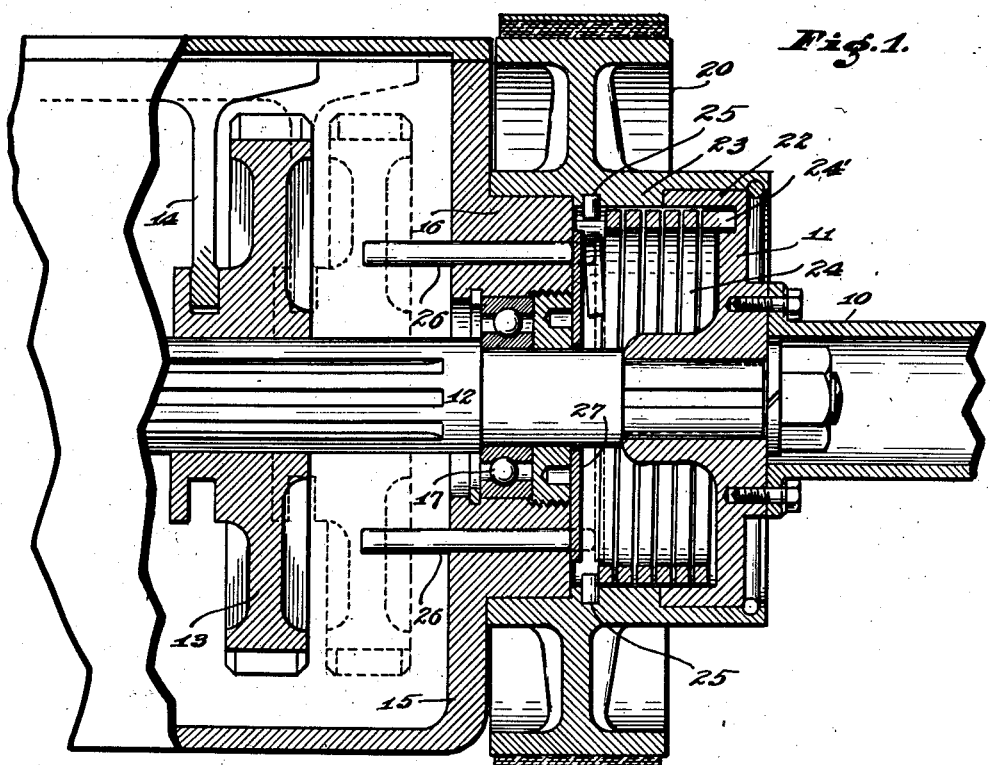
Figure 2:
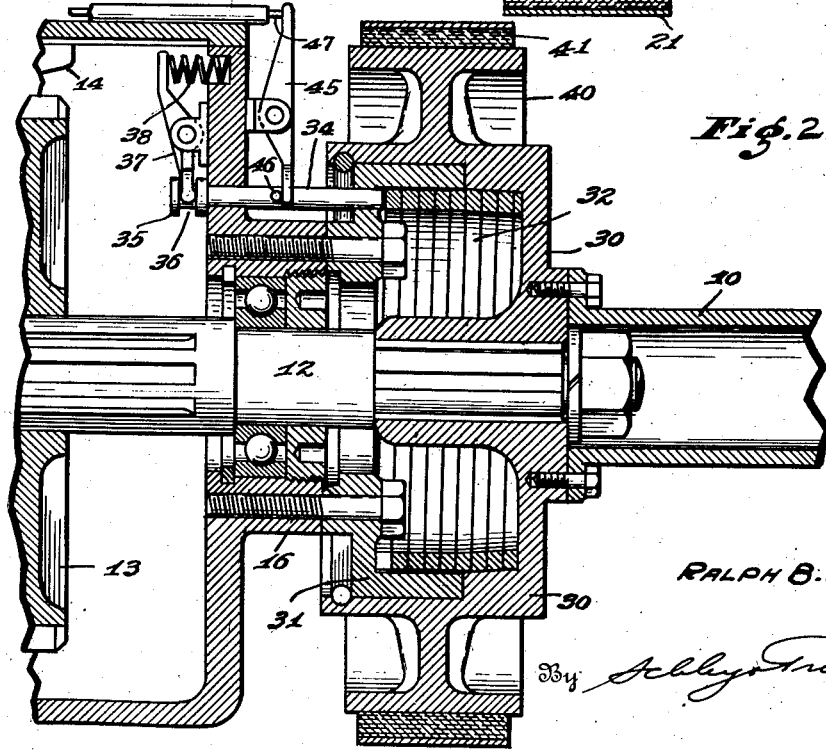

The accompanying drawing illustrates my invention as applied to an automobile: Fig. 1 is a longitudinal section through the rear end of the automobile transmission and the front end of the propeller shaft showing my device in association therewith; and Fig. 2 is a similar view illustrating a modification of my invention.

In the construction illustrated in Fig. 1, the front end of the propeller shaft 10 of the automobile is attached to a coupling member 11 which in turn is secured to the rear end of the driven shaft 12 of the automobile transmission. My invention is not concerned with the details of the transmission mechanism, which may be of any suitable type. The transmission mechanism illustrated in the drawing includes a gear 13 slidably mounted on the shaft 12 and normally occupying the full-line position illustrated in Fig. 1. When it is desired to drive the automobile rearwardly, the gear 13 is shifted to the right by means of a shifter 14, and by means of this axial movement is brought into mesh, as is well known, with gears so arranged as to effect rotation of the shaft 12 in such a direction as to produce rearward movement of the automobile.

The casing 15 within which the transmission gearing is contained is provided on its rear face with a cylindrical boss 16 concentric with the shaft 12. Within this boss may be mounted an anti-friction bearing 17 for supporting the rear end of the shaft 12. The outer cylindrical surface of the boss 16 is finished to provide a bearing for a brake drum 20 adapted to be engaged by a permanently tightened stationary brake-band 21 which opposes rotation of the drum 20.

My device operates between the coupling member 11 and the brake drum 20 and serves normally to connect the coupling member 11 with the brake drum 20 whenever the automobile tends to move rearwardly. The connection thus provided is a releasable one, and is so arranged as to release when the gear 13 is shifted to effect rearward movement of the automobile under engine power.

In my device as illustrated in the drawing, I employ a clutch spring of the expanding type. To this end, the coupling member 11 is provided with a forwardly extending annular flange 22 adapted to be received within a counter-bored portion of the hub 23 of the brake drum 20. The inner surface of the flange 22 and the inner surface of the hub 23 beyond the counter-bore are of the same diameter in order that they may provide a substantially continuous cylindrical surface. Located within the bore of the hub 23 and within the flange 22 is a helical spring 24 secured at one end to the coupling member 11. To effect this result, the spring 24 may be provided with an out-bent end 24' arranged to be received in a depression in the bottom of the recess in the coupling member 11.

The spring 24 is an open-wound spring; and, in its normal state, is of a slightly smaller diameter than the recesses within which it is contained. Within the bore of the brake drum 20 and in the transverse plane of the free end of the spring 24, I provide one or more abutments which may take the form of pins 25 secured to the brake drum. The pins 25, projecting into the path of the free end of the spring 24, will engage such spring and cause it to unwind and expand into firm frictional engagement with the walls of its associated recesses whenever the propeller shaft 10 rotates as a result of undesired rearward movement of the automobile. This expansion of the spring 24 clutches the coupling member 11 and the brake drum 20 together with the result that rotation of the propeller shaft 10 is opposed by the action of the brake-band 21.

When the operator desires to move the automobile to the rear, the transmission gear 13 is shifted from the full-line to the dotted-line position shown in Fig. 1. During this movement, the rear face of the gear 13 engages a plurality of pins 26 which extend longitudinally through the boss 16 and abut against a washer 27 engaging the forward end of the spring 24. This washer 27 has a diameter great enough to permit it to engage the last spring-turn but small enough to permit its passage beyond the pins 25. The rearward movement of the gear 13 to the dotted line position shown in Fig. 1 compresses the spring 24 and moves its free end out of the plane of the pins 25. As a result, the spring 24 is free from any connection to the brake drum 20, and the automobile can therefore be driven to the rear.

In the modification of my invention illustrated in Fig. 2, the same propeller shaft 10, driven transmission shaft 12, and reverse gear 13 are employed. Instead of the coupling member 11, however, I mount on the rear end of the shaft 12 a member 30 to which the propeller shaft 10 is attached. On the boss 16 of the transmission casing 15, there is mounted a stationary cup-shaped member 31 which extends into a counter-bored portion of the member 30. Located within the cup-shaped member 31 and attached to the member 30 so as to rotate therewith, is a helical spring 32. This spring differs from the spring 24 illustrated in Fig. 1 in that it need not be an open-wound spring. Instead of being attached to the member 30 by an out-bent end, the bore of the member 30 is tapered so that the spring is radially compressed and bears against the walls of the bore of the member 30. The bore of the cup-shaped member 31 is slightly larger than the normal exterior diameter of the spring in order that the spring may rotate freely when it is not subjected to a torque tending to cause its expansion.

Through the bottom of the cup-shaped member 31 and through the rear wall of the transmission casing 15, there extends a clutch-actuating pin 34 the rear end of which is normally disposed in the path of movement of the free end of the spring 32. The pin 34 is provided within the transmission casing 15 with a head 35 having a peripheral groove 36 adapted to receive the bifurcated end of a lever 37 pivotally mounted on the rear wall of the transmission casing. The other end of the lever 37 projects into the path of the shifter 14 and is yieldingly pressed forwardly as by means of a compression spring 38 acting between it and the rear wall of the transmission casing.

The spring 38 serves normally to hold the pin 34 in such a position that its rear end projects into the path of movement of the free end of the spring 32. As a result, whenever the automobile tends to move rearwardly, the free end of the spring 32 strikes the pin 34 and the spring is unwound and expanded into firm frictional engagement with the wall of the recess in the stationary cup-shaped member 31. This frictional engagement between the spring and the member 31 prevents rotation of the propeller shaft and stops the rearward movement of the vehicle. Free forward movement of the vehicle is not interfered with, for the pin 34 cannot prevent rotation of the spring 32 in the direction in which such spring rotates when the vehicle is moved forwardly. When the operator desires to drive the automobile to the rear, the gear 13 is shifted to the rear by the movement of the shifter 14; and in its rearward movement, the end of the shifter engages the upper end of the lever 37 and rocks such lever to retract the pin 34 so that its rear end is no longer in the path of movement of the free end of the spring 32. Under these circumstances, since the spring 32 is normally of a slightly smaller diameter than the recess 31, free rotation of the propeller shaft 10 is permitted.

Since it may at times be desired to move the automoblie to the rear, as by pushing or towing it, I prefer to employ clutch-release means other than that operated in accordance with the condition of the transmission. To this end, I may mount on the transmissions casing 15 a pivoted lever 45 having a bifurcated end adapted to engage a cross pin 46 in the spring-actuating pin 34. The other end of the lever 45 is connected to a Bowden wire 47, the control for which may be located in any desired position.

If desired, the coupling member 30 may be provided with an annular rim 40 forming the brake drum of a transmission brake. A retractable brake-band 41 co-operates with the drum 40. This forms no part of my invention, however, except in so far as the coupling member 30 has a double function as the hub of the brake drum and as one of the clutch members co-operating with the spring 32.

The two forms of spring-actuating means which I have described and illustrated are only examples of many different actuating means which may be employed, and my invention is not limited to the use of any specific clutch-spring-actuating means. Although both figures of the drawing illustrate my device as located at the point where the propeller shaft is attached to the rear end of the driven transmission shaft, my device may be located in other positions if desired. By locating it where I do, however, I am enabled to employ a simple mechanism for rendering the clutch spring inoperative when the transmission is set to provide a reverse drive.

Both forms of my invention which I have illustrated and described accomplish the same result in that they prevent unintended rearward movement of the automobile. In the construction illustrated in Fig. 2, unintended rearward movement of the vehicle would result in its sudden stoppage; for the coupling member 30 would be immediately clutched to the stationary cup-shaped member 31. In the modification of my invention illustrated in Fig. 1, on the other hand, the stoppage of unintended rearward movement would be more gradual; for, as the result of such movement, the coupling member 11 would be clutched to the drum 20 which can rotate although its rotation is opposed by the permanently contracted brake-band 21, the tightness of which may be varied.

My invention is not limited to automobiles, but it can be used in connection with any vehicle or conveyance which may at times have a tendency toward unintended movement in one direction and which is provided with driving means for driving it in either direction. As applied to automobiles, it prevents unintended rearward movement of the vehicle when on a hill or slope. This is of great advantage in the case of engine failure or in case the operator encounters difficulty in shifting from a higher to a lower gear while driving up a hill. Further, it facilitates starting on a hill; for its presence in an automobile makes it unnecessary for the driver to control simultaneously, the clutch, the brakes, and the throttle.

I claim as my invention:

1. In an automobile having a transmission capable of being arranged to provide forward and reverse drive, one or more driving wheels, and a propeller shaft for transmitting power from said transmission to said driving wheels; the combination of a helical spring rotatable with said propeller shaft, a member having a cylindrical recess co-axial with said spring, spring actuating means normally operative when said propeller shaft tends to rotate in a reverse direction to impose on said spring a torque causing it to unwind and to expand into gripping engagement with the wall of said recess to connect said member and shaft, and means for rendering said spring actuating means inoperative when said transmission is arranged to provide a reverse drive.

2. The invention set forth in claim 1 with the addition that said recessed member is rotatable, and brake means opposing rotation of said member.

3. In an automobile having a transmission capable of being arranged to provide forward and reverse drives, one or more driving wheels, and a propeller shaft for transmitting power from said transmission to said driving wheels; the combination of a helical spring, a member having a cylindrical recess co-axial with said spring, spring actuating means normally operative when said propeller shaft tends to rotate in a reverse direction to impose on said spring a torque causing it to unwind and to expand into gripping engagement with the wall of said recess to connect said member and shaft, and means for rendering said spring actuating means inoperative when said transmission is arranged to provide a reverse drive.

4. The invention set forth in claim 3 with the addition that said recessed member is rotatable, and brake means opposing rotation of said member.

5. In combination, two relatively rotatable members, driving means capable of being arranged to rotate one of said members in either direction, clutch means operative normally to clutch said two rotatable members together when the driven rotatable member tends to rotate in one direction, and clutch release means for rendering said clutch means inoperative when said driving means is arranged to rotate the driven rotatable member in such direction, said clutch means comprising a helical spring located in axial recesses in said two rotatable members and adapted to be expanded into firm frictional engagement with the walls of its associated recesses.

6. In combination, two relatively rotatable members, driving means capable of being arranged to rotate one of said members in either direction, clutch means operative normally to clutch said two rotatable members together when the driven rotatable member tends to rotate in one direction, and clutch release means for rendering said clutch means inoperative when said driving means is arranged to rotate the driven rotatable member in such direction, said clutch means comprising a helical spring operatively connected to one of said two rotatable members, the other of said two rotatable members having a cylindrical surface which said spring can grip.

7. In combination, two relatively rotatable members, driving means capable of being arranged to rotate one of said members in either direction, control mechanism for said driving means, clutch means operated normally to clutch said two relatively rotatable members together when the driven rotatable member tends to rotate in one direction, clutch release means for rendering said clutch means inoperative when said control mechanism is arranged to cause said driving means to rotate the driven member in such direction and additional clutch release means operable independently of said control mechanism.

8. In an automobile having a shaft arranged to rotate in one direction when the automobile moves backward, and in the opposite direction when the automobile moves forward, a rotatable member, brake means associated with said rotatable member for opposing its rotation, and uni-directional clutch means for operatively interconnecting said shaft and said rotatable member when the automobile moves backward, said clutch means permitting free relative rotation of said shaft and rotatable member when the automobile moves forward.

9. In an automobile having a transmission capable of being arranged to provide forward and reverse drives, one or more driving wheels, and a propeller shaft for transmitting power from said transmission to said driving wheels; the combination of a rotatable member, brake means associated with said rotatable member for opposing its rotation, uni-directional clutch means for operatively interconnecting said propeller shaft and said rotatable member when the propeller shaft tends to rotate in a reverse direction, and mechanism for rendering said clutch means inoperative when said transmission is arranged to provide a reverse drive.

10. In combination, two relatively rotatable members, brake means for opposing rotation of one of said members, driving means capable of being arranged to rotate the other of said members in either direction, control mechanism for said driving means, uni-directional clutch means normally operative to clutch said two rotatable members together when the driven rotatable member tends to rotate in one direction, and clutch-releasing means for rendering said clutch means inoperative when said control mechanism is arranged to cause said driving means to rotate the driven member in such direction.

In witness whereof, I have hereunto set my hand at Indianapolis, Indiana, this 30th day of December, A. D. one thousand nine hundred and twenty-seven.

RALPH B. BURTON.